United States Patent
Siswick et al.

(10) Patent No.: US 9,764,699 B2
(45) Date of Patent: Sep. 19, 2017

(54) POSITION-BASED PERFORMANCE OF A VEHICLE FUNCTION IN A VEHICLE COMMUNICATION SYSTEM

(71) Applicant: Jaguar Land Rover Limited, Coventry (GB)

(72) Inventors: Howard Siswick, Coventry (GB); Mohammed Khan, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/894,527

(22) PCT Filed: May 29, 2014

(86) PCT No.: PCT/EP2014/061210
§ 371 (c)(1),
(2) Date: Nov. 29, 2015

(87) PCT Pub. No.: WO2014/191537
PCT Pub. Date: Dec. 4, 2014

(65) Prior Publication Data
US 2016/0101745 A1    Apr. 14, 2016

(30) Foreign Application Priority Data
May 31, 2013   (GB) .................................. 1309744.9

(51) Int. Cl.
*B60R 25/24*    (2013.01)
*B60R 16/023*    (2006.01)
(Continued)

(52) U.S. Cl.
CPC ........ *B60R 16/023* (2013.01); *G07C 9/00309* (2013.01); *H04L 67/125* (2013.01);
(Continued)

(58) Field of Classification Search
CPC ... B60R 16/023; B60R 25/24; G07C 9/00309; G07C 9/00; H04L 29/08; G04W 4/04; G04W 24/00; G01S 5/02
(Continued)

(56) References Cited

U.S. PATENT DOCUMENTS 5,417,312 A    5/1995    Tsuchitani et al.
5,561,331 A   10/1996    Suyama et al.
(Continued)

FOREIGN PATENT DOCUMENTS

CN    1394253 A    1/2003
CN    201893808 U    7/2011
(Continued)

OTHER PUBLICATIONS

Combined Search and Examination Report, GB 1309743.1, Nov. 29, 2013, 7 pages.
(Continued)

*Primary Examiner* — Tan Q Nguyen
(74) *Attorney, Agent, or Firm* — Myers Bigel, P.A.

(57) ABSTRACT

A vehicle communication system (100) for facilitating control over a function of a vehicle (102) comprises a base station (104) positioned in the vehicle (102) and a mobile communication unit (122). The base station (104) comprises a first transmitter for transmitting a signal to the mobile communication unit and a first receiver for receiving a signal from the mobile communication unit (122). The base station (104) is configured to receive a first request from the mobile communication unit (122), wherein the first request seeks performance of a first vehicle function, determine a position of the mobile communication unit (122) relative to the vehicle (102), compare the position of the mobile communication unit (122) relative to the vehicle (102) to a first criteria, and facilitate performance of the first vehicle function if the position of the mobile communication unit (122) relative to the vehicle (102) satisfies the first criteria.

17 Claims, 6 Drawing Sheets

(51) Int. Cl.
*H04L 29/08* (2006.01)
*H04W 4/04* (2009.01)
*G01S 5/02* (2010.01)
*G07C 9/00* (2006.01)

(52) U.S. Cl.
CPC .. *H04W 4/046* (2013.01); *G07C 2009/00507* (2013.01); *G07C 2209/63* (2013.01)

(58) Field of Classification Search
USPC .................................. 701/2, 301; 455/456.1
See application file for complete search history.

(56) References Cited

U.S. PATENT DOCUMENTS

| | | | | |
|---|---|---|---|---|
| 6,034,617 | A * | 3/2000 | Luebke | G07C 9/00309 307/10.2 |
| 6,236,333 | B1 | 5/2001 | King | |
| 6,259,362 | B1 | 7/2001 | Lin | |
| 7,844,377 | B2 | 11/2010 | Oota et al. | |
| 8,761,603 | B1 | 6/2014 | Maleki | |
| 9,193,331 | B2 * | 11/2015 | Endo | B60R 25/2045 |
| 9,220,078 | B1 | 12/2015 | Bietz | |
| 2001/0038328 | A1 | 11/2001 | King et al. | |
| 2002/0109587 | A1 | 8/2002 | Attring et al. | |
| 2003/0181169 | A1 | 9/2003 | Mutoh | |
| 2006/0077042 | A1 | 4/2006 | Hock | |
| 2006/0091997 | A1 | 5/2006 | Conner et al. | |
| 2007/0024121 | A1 | 2/2007 | Teshima et al. | |
| 2007/0024416 | A1 | 2/2007 | Tang et al. | |
| 2007/0038344 | A1 | 2/2007 | Oota et al. | |
| 2007/0085658 | A1 * | 4/2007 | King | B60R 25/24 340/5.72 |
| 2008/0284564 | A1 | 11/2008 | Leitch | |
| 2009/0146846 | A1 | 6/2009 | Grossman | |
| 2009/0289759 | A1 | 11/2009 | Tsuchiya et al. | |
| 2010/0052931 | A1 | 3/2010 | Kolpasky et al. | |
| 2010/0075656 | A1 | 3/2010 | Howarter et al. | |
| 2010/0076622 | A1 | 3/2010 | Dickerhoof et al. | |
| 2010/0138079 | A1 | 6/2010 | Ögren | |
| 2010/0245038 | A1 | 9/2010 | Ghabra et al. | |
| 2010/0271171 | A1 | 10/2010 | Sampei | |
| 2011/0156885 | A1 | 6/2011 | Baek et al. | |
| 2011/0224870 | A1 | 9/2011 | Tan | |
| 2012/0044974 | A1 | 2/2012 | Mukai et al. | |
| 2012/0092129 | A1 | 4/2012 | Lickfelt | |
| 2012/0129545 | A1 | 5/2012 | Hodis et al. | |
| 2012/0158214 | A1 | 6/2012 | Talty et al. | |
| 2012/0262340 | A1 | 10/2012 | Hassan et al. | |
| 2012/0268242 | A1 * | 10/2012 | Tieman | B60R 25/24 340/5.61 |
| 2013/0054095 | A1 | 2/2013 | Suzuki et al. | |
| 2013/0143594 | A1 | 6/2013 | Ghabra et al. | |
| 2013/0171995 | A1 | 7/2013 | Fujishiro et al. | |
| 2013/0342379 | A1 * | 12/2013 | Bauman | G01S 13/0209 342/21 |
| 2015/0080021 | A1 | 3/2015 | Bietz | |
| 2015/0168174 | A1 | 6/2015 | Abramson | |
| 2016/0059827 | A1 * | 3/2016 | Uddin | B60R 25/245 701/2 |
| 2016/0182548 | A1 * | 6/2016 | Ghabra | H04W 24/00 726/23 |

FOREIGN PATENT DOCUMENTS

| | | |
|---|---|---|
| CN | 102582537 A | 7/2012 |
| CN | 102747893 A | 10/2012 |
| CN | 103946899 A | 7/2014 |
| DE | 10 2006 037 237 A1 | 2/2008 |
| DE | 20 2010 017 197 U1 | 10/2011 |
| EP | 1 143 089 A2 | 10/2001 |
| EP | 1 447 775 A2 | 8/2004 |
| EP | 1 916 162 A2 | 4/2008 |
| GB | 2 335 002 A | 9/1999 |
| GB | 2 496 755 A | 5/2013 |
| GB | 2496755 A | 5/2013 |
| JP | 2003-278418 A | 10/2003 |
| JP | 2004-308165 A | 11/2004 |
| JP | 2005-009200 A | 1/2005 |
| JP | 2007-039922 A | 2/2007 |
| JP | 2007-049561 A | 2/2007 |
| JP | 2008-255750 A | 10/2008 |
| JP | 2009-038745 | 2/2009 |
| JP | 2010-053632 A | 3/2010 |
| JP | 2010-160017 A | 7/2010 |
| JP | 2010-173384 | 8/2010 |
| JP | 2010-0276594 A | 12/2010 |
| JP | 2011-025715 A | 2/2011 |
| JP | 2011-184963 A | 9/2011 |
| JP | 2012-060609 A | 3/2012 |
| JP | 2012-149474 A | 8/2012 |
| JP | 2013-044687 A | 3/2013 |
| WO | WO 02/38895 A1 | 5/2002 |
| WO | WO 2007/010371 A1 | 1/2007 |
| WO | WO 2007/073969 A1 | 7/2007 |
| WO | WO 2012/084111 A1 | 6/2012 |
| WO | WO 2013/072489 A1 | 5/2013 |

OTHER PUBLICATIONS

Combined Search and Examination Report, GB 1309744.9, Nov. 29, 2013, 7 pages.
Combined Search and Examination Report, GB 1309748.0, Dec. 6, 2013, 6 pages.
Combined Search and Examination Report, GB 1409778.6, Nov. 28, 2014, 6 pages.
Combined Search and Examination Report, GB 1409725.7, Dec. 2, 2014, 5 pages.
Examination Report, GB 1309747.2, Jun. 4, 2015, 2 pages.
Examination Report, GB 1309745.6, Jun. 4, 2015, 2 pages.
Examination Report, GB 1309748.0, Oct. 9, 2015, 3 pages.
Notification of Transmittal of the International Search Report and the Written Opinion of the International Searching Authority, or the Declaration, PCT/EP2014/061208, Jul. 16, 2014, 12 pages.
Notification of Transmittal of the International Search Report and the Written Opinion of the International Searching Authority, or the Declaration, PCT/EP2014/061210, Sep. 2, 2014, 12 pages.
Notification of Transmittal of the International Search Report and the Written Opinion of the International Searching Authority, or the Declaration, PCT/EP2014/061336, Sep. 2, 2014, 14 pages.
Notification of Transmittal of the International Search Report and the Written Opinion of the International Searching Authority, or the Declaration, PCT/EP2014/061401, Sep. 2, 2014, 14 pages.
Notification of Transmittal of the International Search Report and the Written Opinion of the International Searching Authority, or the Declaration, PCT/EP2014/061252, Aug. 28, 2014, 13 pages.
Search Report, GB 1309745.6, Dec. 4, 2013, 5 pages.
Search Report, GB 1309747.2, Dec. 6, 2013, 4 pages.
Notice of Reasons for Rejection, Japanese Patent Application No. 2016-516185, Jan. 10, 2017, 6 pages.
Notification of Reasons for Refusal, Japanese Patent Application No. 2016-516178, Jan. 24, 2017, 6 pages.
Notice of Reasons for Rejection, Japanese Patent Application No. 2016-516197, Dec. 6, 2016, 8 pages.
Notification of First Office Action, Chinese Patent Application No. 201480031199.2, Nov. 16, 2016, 21 pages.
Notice of Reasons for Rejection, Japanese Application No. 2016-516177, Jan. 4, 2017.
Notification of First Office Action, Chinese Patent Application No. 201480031134.8, Nov. 2, 2016, 14 pages.
Notice of Reasons for Refusal, Japanese Application No. 2016-516200, Jan. 4, 2017.

* cited by examiner

POSITION-BASED PERFORMANCE OF A VEHICLE FUNCTION IN A VEHICLE COMMUNICATION SYSTEM

RELATED APPLICATIONS

This application is a 35 U.S.C. §371 national stage application of PCT Application No. PCT/EP2014/061210, filed on May 29, 2014, which claims priority from Great Britain Patent Application No. 1309744.9, filed on May 31, 2013, the contents of which are incorporated herein by reference in their entireties. The above-referenced PCT International Application was published in the English language as International Publication No. WO 2014/191537 A1 on Dec. 4, 2014.

TECHNICAL FIELD

The present invention relates to a vehicle communication system for facilitating control over vehicle functions. The present invention relates more particularly, but not exclusively, to systems and methods for facilitating control over vehicle functions based, at least in part, on position of a mobile communication unit. Aspects of the invention relate to a system, to a method and to a vehicle.

BACKGROUND OF THE INVENTION

In today's world, many vehicles are equipped with systems for facilitating remotely controlled vehicle functions such as passive entry and passive starting (i.e., PEPS) of a host vehicle. When a vehicle is equipped with a PEPS system, a user may carry a mobile communication unit which can communicate with a base station located in the vehicle. To initiate communication, the base station may emit a relatively powerful Low Frequency (LF) electromagnetic field, causing a mobile communication unit that is sufficiently close to the base station to awaken. Once the mobile communication unit is awake, it may use Radio Frequency (RF) transmissions to dispatch signals, which may be validated by the base station. If the base station recognizes and approves the identity of the mobile communication unit, (i.e., the base station authenticates the mobile communication unit), the base station may facilitate the performance of a predefined vehicle function, such as actuating a door lock mechanism, causing the door to become unlocked. In such passive systems, the functions may be performed based solely on the position, or changes in the position, of the mobile communication unit, and the functions may be performed even though no specific command may have been initiated by the user.

For example, in some passive systems, an approach of the mobile communication unit toward the vehicle may be detected so that a desire for one or more vehicle functions to be performed (e.g., unlocking doors) may be anticipated and automatically provided in a manner that enhances the operator experience. In other passive systems, a departure of the mobile communication unit away from the vehicle may be detected so that one or more other functions (e.g., locking vehicle doors) may be performed.

In addition to the above-described passive communications, a vehicle communication system may also be configured to facilitate active communications among system components. Active communications may include transmissions initiated by a user seeking performance of a predefined function. For example, a user, by pressing a button or actuating a switch on a mobile communication unit, may actively initiate active communications with the vehicle, sending a command to lock or unlock the vehicle doors or to actively start the vehicle engine.

Unfortunately, by facilitating such active interactions, a vehicle communication system may increase the possibility for a user to submit an unintentional or inadvertent communication input via the mobile communication unit. If the user is in a position to observe the inadvertent instruction being performed, the user may correct the error by issuing a counteracting request. If the user is not so advantageously positioned, however, no corrective action may be initiated, and an undesirable consequence may occur. For example, if a mobile communication unit were configured with a button for sounding an alarm on the vehicle, and if a user were to inadvertently press the button while being situated so as to be unable to hear the alarm, yet within range for the command to be received by a base station in the vehicle, the alarm may be unintentionally activated without the knowledge of the user.

While such events are annoying, they may not be nearly as wasteful as having the vehicle engine running all day long while the user unknowingly conducts a full day of affairs in a nearby office. One can envision more damaging consequences where the mobile communication unit is configured for enabling a user to remotely open the vehicle windows. Thus, it would be advantageous to have a vehicle communication system that provides for active communications with a vehicle and control over vehicle functions, while also decreasing the likelihood of dispatching inadvertent or unintentional commands to be performed by the vehicle.

The present invention attempts to address or ameliorate at least some of the above problems associated with vehicle communication systems.

SUMMARY OF THE INVENTION

In one aspect, the present invention provides a vehicle communication system for facilitating control over a function of a vehicle comprising a base station positioned in the vehicle and a mobile communication unit. The base station comprises a first transmitter for transmitting a signal to the mobile communication unit and a first receiver for receiving a signal from the mobile communication unit. The base station is configured to receive a first request from the mobile communication unit, wherein the first request seeks performance of a first vehicle function. The base station is also configured to determine a position of the mobile communication unit relative to the vehicle and to compare the position of the mobile communication unit relative to the vehicle to a first criteria. Finally, the base station is configured to facilitate performance of the first vehicle function if the position of the mobile communication unit relative to the vehicle satisfies the first criteria.

The base station may be configured to determine the position of the mobile communication unit relative to the vehicle based on a time of flight method. The first transmitter may be an ultra-wideband transmitter and the first receiver may be an ultra-wideband receiver. It is a particular advantage of ultra-wide communications that it is possible to distinguish between signals which travel along a direct path between transmitter and receiver and those which follow non-direct paths. Accordingly, this allows the position of the mobile communication unit relative to the vehicle to be established with a high degree of accuracy, much more so than distance measurements in conventional narrow-band systems which typically rely on radio signal strength intensity (RSSI) measurements.

The base station may be configured to facilitate performance of the first vehicle function only if the position of the mobile communication unit satisfies the first criteria. In one embodiment, the first criterion requires that the position be less than a first distance from the vehicle. In another alternative embodiment, the first criterion requires that the position be greater than a first distance from the vehicle.

In another embodiment, the base station is configured to receive a second request from the mobile communication unit, wherein the second request seeks performance of a second vehicle function. In this embodiment, the base station is configured to compare the position of the mobile communication unit relative to the vehicle to a second criteria and to facilitate performance of the second vehicle function if the position of the mobile communication unit relative to the vehicle satisfies the second criteria. The base station may be configured to facilitate performance of the first vehicle function only if the position of the mobile communication unit satisfies the first criteria, and may also be configured to facilitate performance of the second vehicle function only if the position of the mobile communication unit satisfies the second criteria. The first criterion may require that the position be within a first distance from the vehicle, and the second criterion may require that the position be within a second distance from the vehicle. The first distance may be greater than the second distance.

In another embodiment, a vehicle communication system includes a base station that is configured to receive a third request from the mobile communication unit, the third request seeking performance of a third vehicle function. In this embodiment, the base station is configured to compare the position of the mobile communication unit relative to the vehicle to a third criterion and facilitate performance of the third vehicle function if the position of the mobile communication unit relative to the vehicle satisfies the third criteria.

In an embodiment, the base station is configured to facilitate performance of the first vehicle function only if the position of the mobile communication unit satisfies the first criteria, to facilitate performance of the second vehicle function only if the position of the mobile communication unit satisfies the second criteria, and to facilitate performance of the third vehicle function only if the position of the mobile communication unit satisfies the third criteria. The first criteria may require that the position be within a first distance from the vehicle, the second criteria may require that the position be within a second distance from the vehicle, and the third criteria may require that the position be within a third distance from the vehicle. The first distance may be greater than the second distance, and the second distance may be greater than the third distance.

In an embodiment, the first vehicle function comprises locking an aperture of the vehicle, the second vehicle function comprises starting an engine of the vehicle, and the third vehicle function comprises opening an aperture of the vehicle. The third vehicle function may also comprise closing an aperture of the vehicle.

In another aspect, a method for facilitating control over a function of a vehicle comprises providing a base station positioned in the vehicle and a mobile communication unit, wherein the base station comprises a first transmitter for transmitting a signal and a first receiver for receiving a signal from the mobile communication unit. The method also includes receiving a first request from the mobile communication unit, wherein the first request seeks performance of a first vehicle function, and determining a position of the mobile communication unit relative to the vehicle. Finally, the method includes comparing the position of the mobile communication unit relative to the vehicle to a predetermined first criteria and facilitating performance of the first request if the position of the mobile communication unit relative to the vehicle satisfies a first criteria.

Determining the position of the mobile communication unit relative to the vehicle may be based on a time of flight method. The first transmitter may be an ultra-wideband transmitter and the first receiver may be an ultra-wideband receiver.

In another embodiment, a method for facilitating control over a function of a vehicle further comprises receiving a second request from the mobile communication unit, wherein the second request seeks performance of a second vehicle function. Still further, the method comprises comparing the position of the mobile communication unit relative to the vehicle to a second criteria and facilitating performance of the second vehicle function if the position of the mobile communication unit relative to the vehicle satisfies the second criteria.

In a further embodiment, a method for facilitating control over a function of a vehicle also includes receiving a third request from the mobile communication unit, wherein the third request seeks performance of a third vehicle function. The position of the mobile communication unit relative to the vehicle is compared to a third criterion, and performance of the third vehicle function is facilitated if the position of the mobile communication unit relative to the vehicle satisfies the third criteria.

In another aspect of the invention, a vehicle may be provided having a vehicle communication system, or being adapted to perform a method, as described in the preceding paragraphs of this section.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless such features are incompatible.

BRIEF DESCRIPTION OF THE DRAWINGS

One or more embodiments of the present invention will now be described, by way of example only, with reference to the accompanying figures, in which.

DETAILED DESCRIPTION

Figure 1:
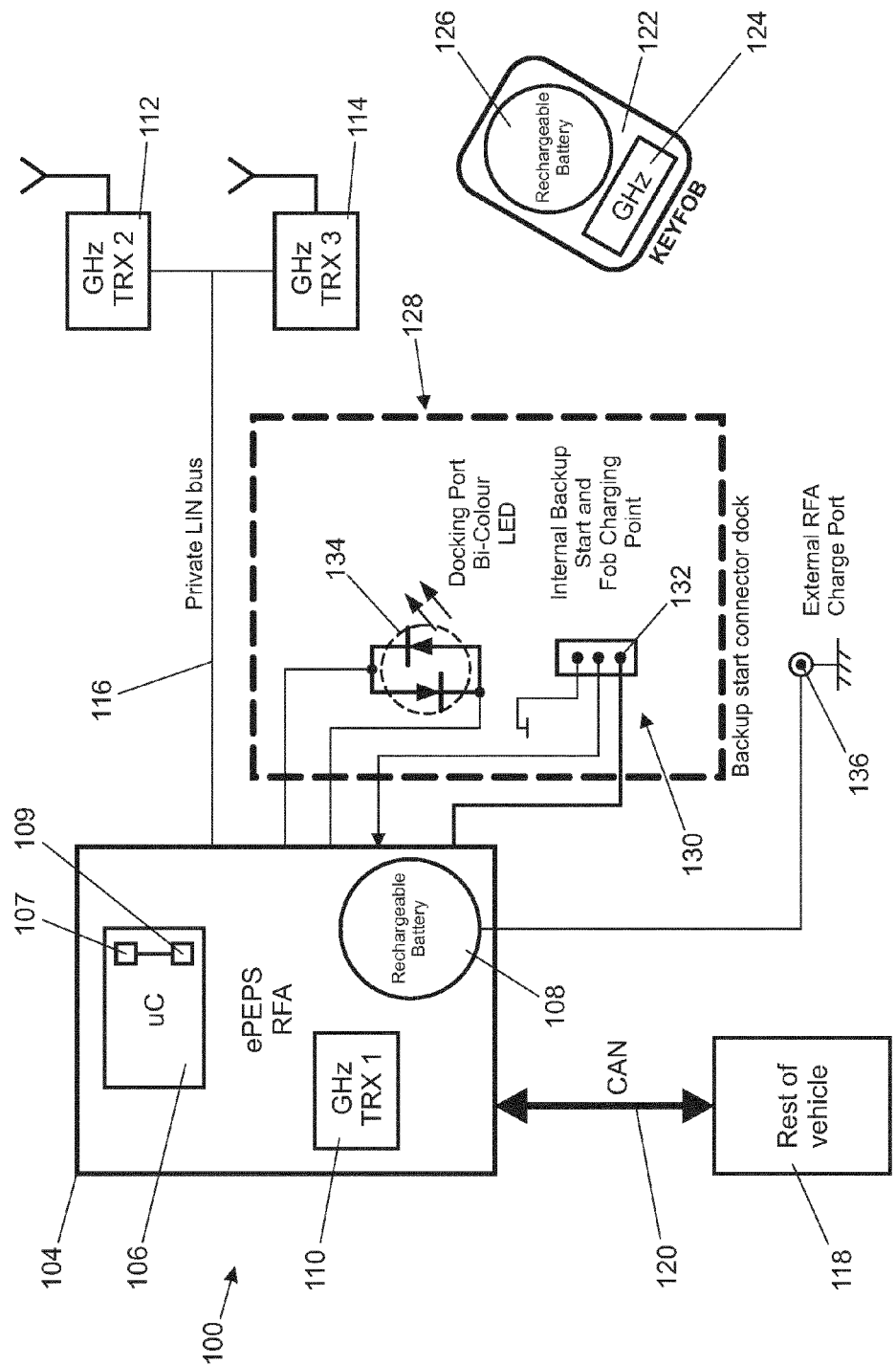
FIG. 1 shows a schematic representation of a vehicle communication system according to an embodiment of the present invention.

FIG. 1 shows a vehicle communication system 100 in accordance with an embodiment of the present invention.

The vehicle communication system 100 is configured to facilitate transfer of information among components of the vehicle communication system 100, which may further facilitate control over one or more functions of a vehicle 102. Exemplary functions that may be controlled include, but are not limited to, enhanced Passive Entry and Passive Start (ePEPS) keyless access, remote engine start, remote opening and closing of vehicle apertures, deployment and retraction of external mirrors or antennas, and/or activation and deactivation of lighting and signalling systems of the vehicle 102.

The vehicle communication system 100 will be described with reference to the vehicle 102 which has a front right door 142, a rear right door 144, a front left door 146 and a rear left door 148. The vehicle 102 also has a boot lid 150 (also known as a deck lid) which can be locked/unlocked by the vehicle communication system 100 but this is not described herein for the sake of brevity. The doors 142-148 each have a lock mechanism and an external handle; and the front doors 142, 146 each have a folding door mirror. The lock mechanisms each comprise a door lock switch to provide a locking signal to indicate the status of the respective lock mechanism.

The vehicle communication system 100 comprises a base station 104 to be installed in the vehicle 102 to provide a Remote Function Actuator (RFA) for the vehicle 102. The base station 104 comprises an electronic control unit 106 and a first rechargeable battery 108. The electronic control unit 106 comprises a memory storage device 107 that is in communication with one or more processor(s) 109. The processor(s) 109 can be configured to perform computational operations in accordance with instructions (e.g., software) stored in the memory storage device 107. The first rechargeable battery 108 provides a dedicated power supply for the base station 104 to enable its operation independently from a vehicle power system (not shown).

The base station 104 further comprises first, second and third ultra-wideband transceivers 110, 112, 114. The first transceiver 110 is provided proximal the electronic control unit 106. The second and third transceivers 112, 114 are positioned in the vehicle 102 remote from the electronic control unit 106 and connected via a dedicated local interconnect network (LIN) 116. The transceivers 110, 112, 114 each have an integrated antenna. As discussed more fully below, the vehicle communication system 100 may further comprise a fourth transceiver (not shown) which is also positioned in the vehicle 102 remote from the electronic control unit 106 and connected via the dedicated local interconnect network (LIN) 116.

The base station 104 is connected to the vehicle systems (denoted generally by the reference numeral 118) via a CAN bus 120. The base station 104 can thereby receive signals from the vehicle systems (e.g., locking signals from door lock switches); and can control operation of one or more vehicle systems (e.g., door lock mechanisms, closure systems for vehicle apertures such as windows, sun roof, ventilation systems, deck lid, engine start/ignition, vehicle lighting, entertainment systems, horn, heater, air conditioning, and the like). The CAN bus 120 can also be employed to convey instructions from the electronic control unit 106 to other systems (e.g., actuators, controls) of the vehicle 102, such as the engine control unit, to facilitate enabling and/or disabling of one or more vehicle systems (e.g., passive engine starting).

The vehicle communication system 100 further comprises a mobile communication unit 122 having a remote ultra-wideband transceiver 124 and a second rechargeable battery 126. The mobile communication unit 122 is portable to facilitate its being carried by the user. As described herein, the mobile communication unit 122 communicates with the base station 104 to facilitate control over vehicle functions, such as passive entry to the vehicle 102, and, under some circumstances, to provide information to a user in possession of the mobile communication unit 122.

The base station 104 further comprises a dock 128 for receiving the mobile communication unit 122. The dock 128 has a port 130 to enable communication between the base station 104 and the mobile communication unit 122. A charging pad 132 is also provided in the dock 128 to facilitate charging of the second rechargeable battery 126 when the mobile communication unit 122 is docked and thus mated with the charging pad 132. A bi-colour light emitting diode 134 is provided in the dock 128 to indicate the status of the mobile communication unit 122 (for example to indicate that the second rechargeable battery 126 is charging or is fully charged). The charging pad 132 is connected to a power supply unit (PSU) provided in the base station 104. An external charge port 136 for the base station 104 is provided for charging the first rechargeable battery 108.

Figure 2:
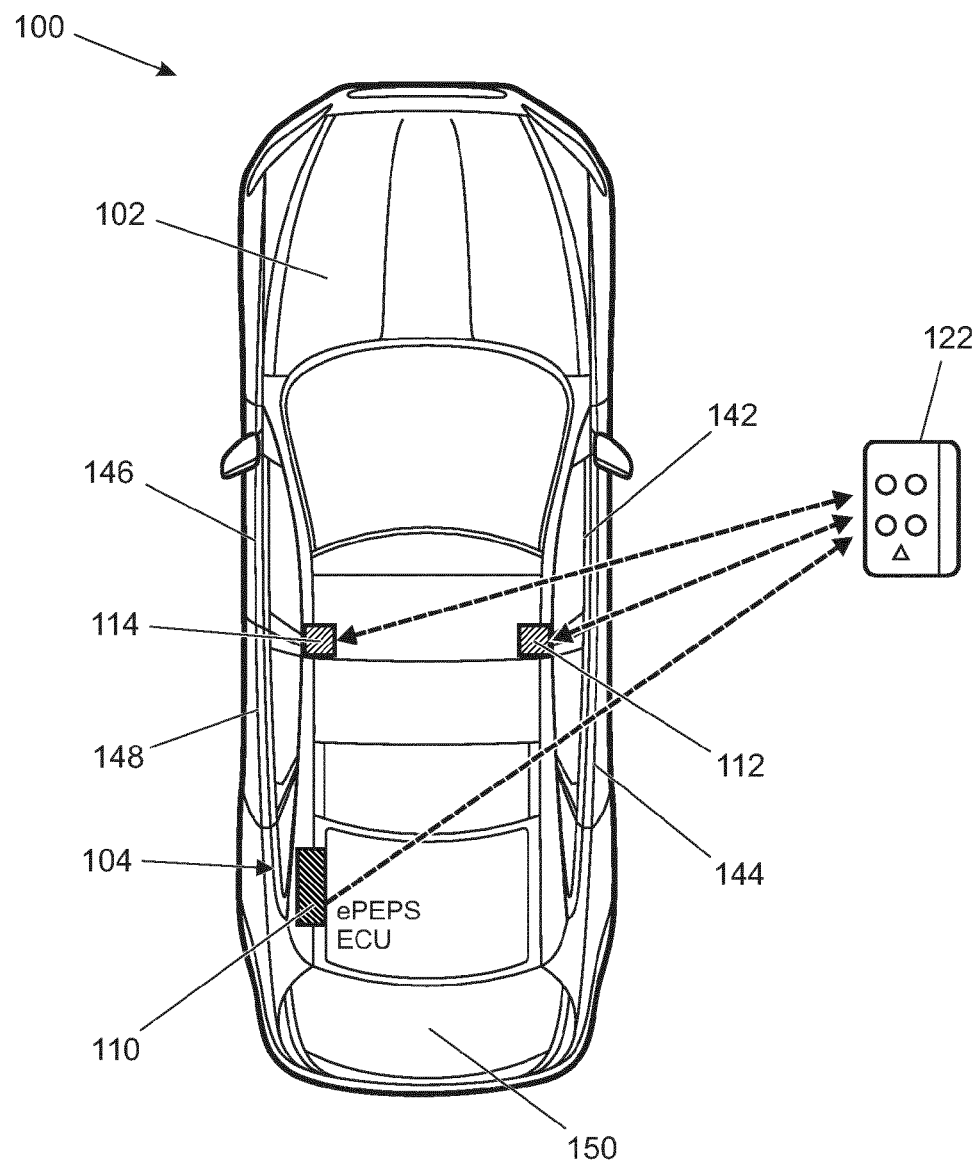
FIG. 2 shows the installation of the base station and transceivers of the vehicle communication system according to one embodiment of the present invention in a motor vehicle.

The installation of the vehicle communication system 100 is illustrated in FIG. 2. The base station 104 and the first transceiver 110 are located at the rear of the vehicle 102 and the second and third transceivers 112, 114 are located in the upper part of the vehicle 102 (typically in the roof) on the right and left sides respectively of the vehicle 102. As illustrated by dashed lines in FIG. 2, the transceivers 110, 112, 114 communicate with the mobile communication unit 122. The distance from each of the first, second and third transceivers 110, 112, 114 to the remote transceiver 124 can be determined by measuring transmission and/or response time (for example, time of flight for a signal transmission) thereby allowing the position of the mobile communication unit 122 in relation to the vehicle 102 to be determined through triangulation. The use of ultra-wideband frequencies (typically greater than 3 GHz) allows the position of the mobile communication unit 122 to be tracked with a relatively high degree of accuracy.

In accordance with such an embodiment of the vehicle communication system 100, wherein the base station 104 comprises three transceivers 110, 112, 114 disposed at spaced-apart positions within the vehicle 102, it is possible to use the transmission and/or response times for communications sent between the mobile communication unit 122 and each of the transceivers 110, 112, 114 to determine a position of the mobile communication unit 122 relative to the vehicle 102 along each of two axes. For example, with the base station 104 and the first transceiver 110 located toward the rear of the vehicle 102 and with the second and third transceivers 112, 114 disposed within the roof (on respective left and right sides), the position of the mobile communication unit 122 relative to the vehicle 102 can readily be determined, i.e. as shown in the plan view of FIGS. 2 to 6.

However, with the second and third transceivers 112, 114 disposed in the vehicle roof, and therefore lying in the same horizontal plane, there may be situations in which it is not possible to readily determine the position of the mobile communication unit 122 along a direction normal to the plan views of FIGS. 2 to 6 (i.e., above or below the vehicle 102). Accordingly, in a further embodiment of the invention, the vehicle communication system 100 may comprise a fourth transceiver (not shown) which is disposed within the vehicle 102 at a position that is spaced apart in a vertical direction from both the plane of the vehicle roof and the horizontal plane in which the base station 104 lies. For example, the fourth transceiver (not shown) could be mounted in the vehicle dashboard on the vehicle center line. With this configuration, the height of the mobile communication unit 122 relative to the vehicle 102 can readily be determined.

Thus, a position of the mobile communication unit 122 relative to the vehicle 102 may be periodically or continuously determined and may be saved in the memory storage device 107 for subsequent retrieval and analyses by the processor 109 in accordance with instructions that are also stored in the memory storage device 107 or pre-programmed into the processor 109. Such monitoring and storing and processing of position information may be useful for observing, tracking, and identifying not only positions of the mobile communication unit 122, but also certain rates, patterns, and/or characteristics of changes in those positions (i.e., movements of the mobile communication unit 122). Accordingly, the vehicle communication system 100 may be configured to detect an approach of the mobile communication unit 122 toward an authorization zone 138 defined relatively to the vehicle 102, to detect a departure of the mobile communication unit 122 from the authorization zone 138, to detect a continuing presence of the mobile communication unit 122 within the authorization zone 138, and to recognize patterns involving combinations of approaches, departures, and prolonged presences relative to the authorization zone 138 of the vehicle 102. In addition, the vehicle communication system 100 may be configured to determine a position of the mobile communication unit 122 relative to the vehicle 102 and to compare that relative position to one or more predetermined (or learned) criteria. The results of that comparison may then be used by the vehicle communication system 100 in determining whether and how to transmit further communications or to facilitate performance of certain vehicle functions.

The remote transceiver 124 of the mobile communication unit 122 transmits a polling signal which, when received by the first transceiver 110 of the base station 104, initiates communication between the base station 104 and the mobile communication unit 122. In one embodiment, upon receipt of the polling signal, the first transceiver 110 responds by transmitting a challenge signal. The challenge signal is received by the mobile communication unit 122 and prompts the mobile communication unit 122 to transmit a response signal. The electronic control unit 106 receives the response signal and attempts to determine whether it was sent by an authorized device (i.e., to validate or authenticate the mobile communication unit 122).

If the response signal is authenticated, the electronic control unit 106 continues to communicate with the mobile communication unit 122 and tracks its position in relation to the vehicle 102 and may store the position information in the memory storage device 107 for retrieval and processing by the processor 109 in accordance with pre-defined instructions. Moreover, provided the challenge/response sequence is completed successfully, the electronic control unit 106 will provide control over functions of the vehicle 102 subject to satisfaction of operating criteria. If the response signal is not authenticated, the electronic control unit 106 will not facilitate user control over vehicle functions, such as unlocking the doors of vehicle 102 or starting the engine of vehicle 102.

In one mode of operation, the polling signal is transmitted continually by the remote transceiver 124 so that communication with the base station 104 is initiated by the mobile communication unit 122. Accordingly, the vehicle communication system 100 can initiate a challenge/response cycle without the need for user interaction, such as actuating a door handle.

In another mode of operation, such as may be active upon first entry of the vehicle 102 into service, to conserve energy stored in the second rechargeable battery 126, the polling signal is transmitted for an operating period of thirty (30) days. The transmission of the polling signal is stopped if the mobile communication unit 122 does not establish communication with the base station 104 during the operating period. A button provided on the mobile communication unit 122 can be pressed to re-commence transmission of the polling signal after said operating period has expired.

In another embodiment, the polling signal is transmitted intermittently, rather than continuously. In accordance with this embodiment, the polling signal is repeated during the operating period with a time interval between transmission cycles (pulses), i.e. the polling signal is transmitted periodically during the operating period. The time interval between the transmission cycles can be modified in response to measured parameters. For example, the time interval between transmissions can be modified depending on the measured distance between the vehicle 102 and the mobile communication unit 122. For example, if the mobile communication unit 122 is close to the vehicle 102, the time interval can be reduced to one (1) second. Conversely, if the mobile communication unit 122 is relatively far away from the vehicle 102, the time interval can be increased to five (5) seconds.

The base station 104 and the mobile communication unit 122 can communicate with each other over a range of at least 20 meters. The authorization zone 138 is defined within the communication range. For example, the authorization zone 138 may be defined as having a radius of 2 meters around the vehicle 102. When the electronic control unit 106 determines that the mobile communication unit 122 is inside the authorization zone 138, the base station 104 may facilitate automatic unlocking of one or more of the vehicle's doors 142-148. Conversely, when the electronic control unit 106 determines that the mobile communication unit 122 is outside the authorization zone 138, the base station 104 may cause the automatic locking of the vehicle's doors 142-148.

As discussed above, a vehicle communication system 100 comprising three or fewer transceivers may be able to determine a position of the mobile communication unit 122 relative to the vehicle 102 along only two axes. Accordingly, the authorization zone 138 may be defined in terms of only those two axes. A vehicle communication system 100 comprising four or more transceivers, however, may be able to determine a position of the mobile communication unit 122 relative to the vehicle 102 along any combination of three (optionally orthogonal) axes. Accordingly, the dimensions of the authorization zone 138 may be defined in terms positions along each of the three axes, such that the authorization zone 138 (and thus the set of positions that are outside the authorization zone 138) may be defined in terms of three-dimensional space relative to the vehicle 102.

Being able to accurately determine the position of the mobile communication unit 122 in a three-dimension space around the vehicle 102 may be particularly useful in certain situations, for example when the vehicle 102 is parked in a multi-level or multi-story car park or adjacent to a multi-story building. In such situations it is possible that the driver, having exited the vehicle 102 may move to another level of the car park or building above or below the vehicle 102, but may still be sufficiently close to the vehicle 102 to be within the authorization zone 138, resulting in one or more of the vehicle doors being automatically unlocked.

Accordingly, if it is determined that the mobile communication unit 122 is disposed sufficiently above or below the vehicle 102, such as in the example of the multi-level car park, the electronic control unit 106 may use that position information, if it is known, to not unlock the vehicle doors even when the mobile communication unit 122 would otherwise be judged to be within an authorization zone 138 defined in only two dimensions.

The electronic control unit 106 may be configured to operate the vehicle communication system 100 according to a number of operating modes. In a number of scenarios, the mobile communication unit 122 is carried on the person of the user and therefore follows the movements of the user. In the accompanying figures, movement paths of the user, and therefore, the mobile communication unit 122, are illustrated by a set of footprints 140. The process performed by the base station 104 for authenticating the mobile communication unit 122 is the same as described above and is common to each of the operating modes.

In particular, the remote transceiver 124 transmits a polling signal which initiates an authentication cycle with the first transceiver 110. The base station 104 transmits a challenge signal which triggers transmission of a response signal from the mobile communication unit 122. The electronic control unit 106 validates the response signal and, if successful, the base station 104 tracks the range and position of the authenticated mobile communication unit 122. If the authentication cycle is not successfully completed, for example due to an incorrect response signal being sent from the mobile communication unit 122, the function will not be performed (e.g., the doors 142-148 will not be unlocked), and the vehicle 102 will not respond to commands dispatched from the mobile communication unit 122.

Figure 3:
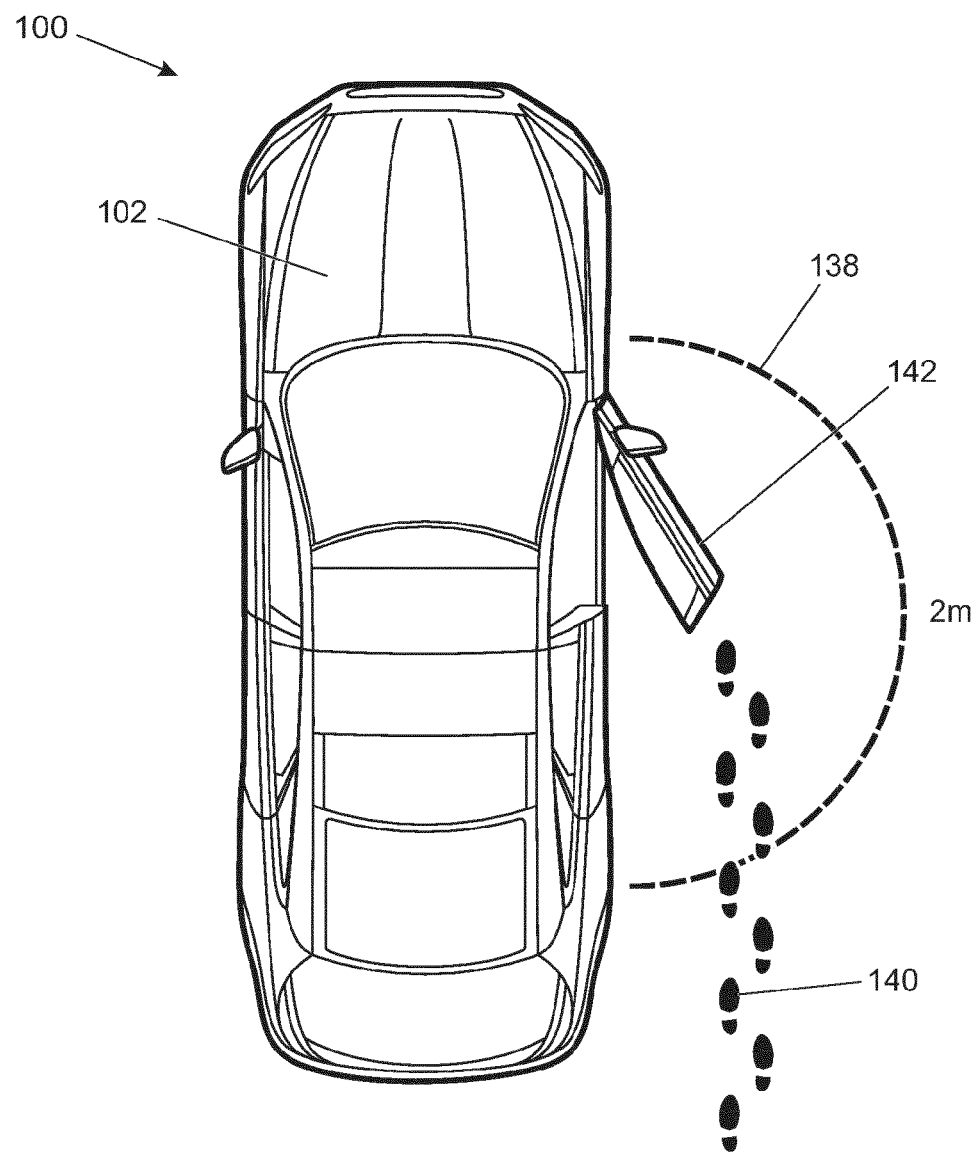
FIG. 3 shows an operating mode of the vehicle communication system according to one embodiment of the present invention.

The electronic control unit 106 may be configured to operate the vehicle communication system 100 according to a first operating mode as illustrated in FIG. 3. In this operating mode, the vehicle communication system 100 operates to unlock the doors 142-148 on the side of the vehicle 102 on which the user approaches with the mobile communication unit 122. Having authenticated the mobile communication unit 122, the base station 104 tracks the range and position of the mobile communication unit 122. In the illustrated example, the electronic control unit 106 determines that the mobile communication unit 122 is on the right hand side of the vehicle 102. Once the base station 104 determines that the mobile communication unit 122 is within the authorization zone 138, the electronic control unit 106 automatically generates a door unlock signal to unlock both doors 142, 144 on the right hand side of the vehicle 102. The door unlock signal is transmitted via the CAN bus 120, and the front right door 142 and the rear right door 144 are both unlocked when the mobile communication unit 122 enters the authorization zone 138. As the doors 142, 144 are unlocked before the user operates the respective door handle, in normal operating conditions it is envisaged that there would be no perceptible delay when the user operates the door handle.

In this mode, when the user operates the door handle on either the front right door 142 or the rear right door 144, either a single-point entry (SPE) or a multiple-point entry (MPE) can be initiated. In single-point entry mode, when the drivers door is the only opened door and the key fob is taken into the vehicle, the rear door on the approached side will be re-locked.

For the avoidance of doubt, the drivers door does not have to be closed to effect the locking of the rear door. If ANY door other than driver's door is opened, then all doors will be unlocked and remain so. The action of locking the rear door on the driver's side is caused by the key fob being detected inside the vehicle and thus no longer seen in the authorisation zone on the outside of the vehicle. In a multiple-point entry, the electronic control unit 106 generates control signals to unlock all of the other doors in the vehicle 102 when the door handle of either the front right door 142 or the rear right door 144 is operated. It will be appreciated that the front left door 146 and the rear left door 148 will be unlocked if base station 104 determines that the mobile communication unit 122 enters the authorization zone 138 on the left hand side of the vehicle 102. Only when the door handle of one of the unlocked doors 142-148 is operated is an indication provided that the doors have been unlocked, for example by flashing the side repeaters and/or extending the door mirrors. If none of the door handles are operated, however, no indication is provided that one or more of the doors 142-148 have been unlocked.

Figure 4:
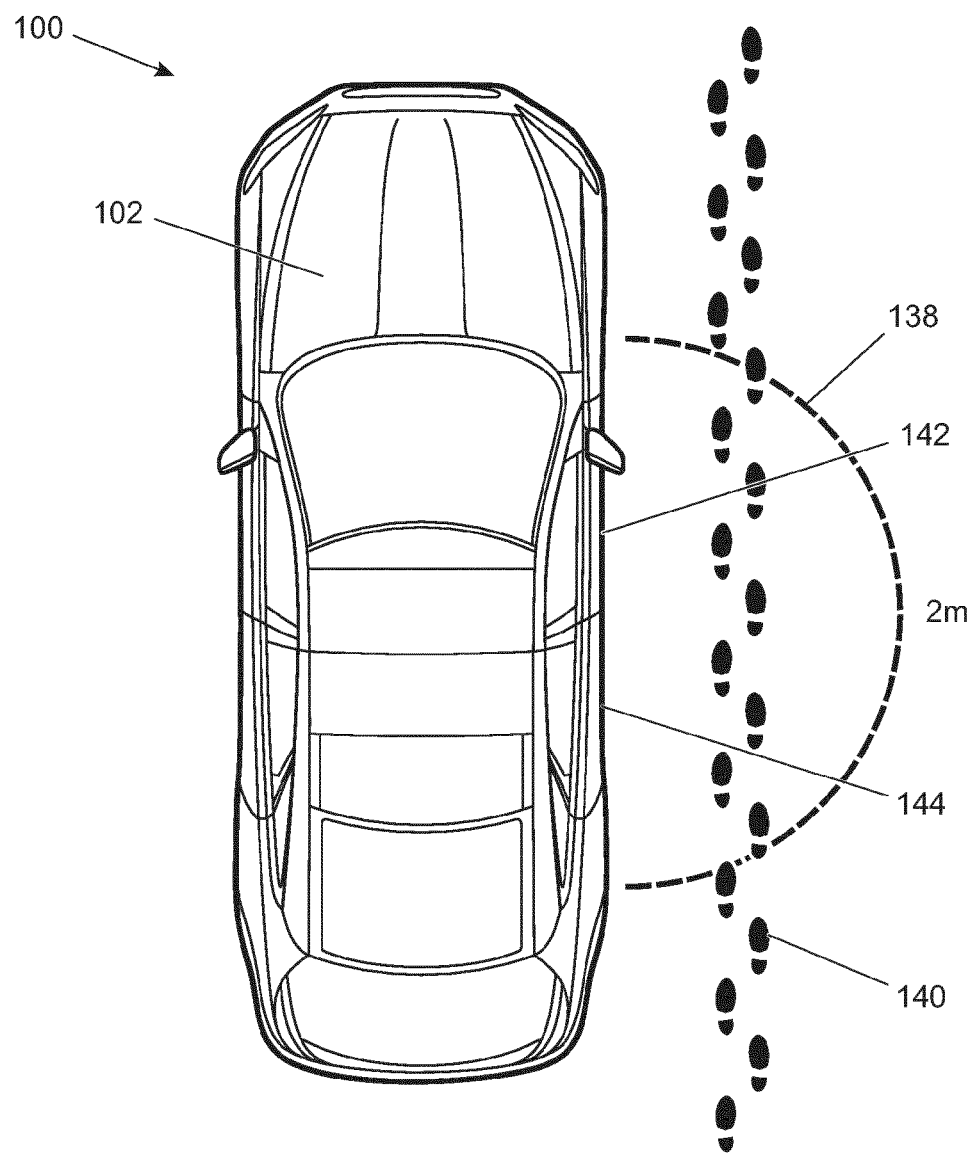
FIG. 4 illustrates another operating mode of the vehicle communication system according to one embodiment of the present invention.

The electronic control unit 106 may be configured to operate the vehicle communication system 100 according to a second operating mode as illustrated in FIG. 4 to accommodate a walk-past scenario. In this walk-past scenario, the user enters and exits the authorization zone 138 but does not operate a door handle. As in the first mode described above, the base station 104 authenticates the mobile communication unit 122 as it approaches the vehicle 102. In this case, the base station 104 tracks the position of the mobile communication unit 122 and determines that the user is approaching from the rear of the vehicle 102 on the right hand side. As described above in regard to the first mode of operation, when the vehicle communication system 100 detects that the mobile communication unit 122 has entered the authorization zone 138, as it has in this walk-past scenario, a door unlock signal is transmitted to unlock the front right door 142 and the rear right door 144.

In this scenario, however, the user does not operate the door handle on either of the doors 142, 144 and, instead, walks past the vehicle 102. Since the vehicle communication system 100 is tracking the position of the mobile communication unit 122, the vehicle communication system 100 is able to determine when the mobile communication unit 122 leaves the authorization zone 138. Accordingly, upon the departure of the mobile communication unit 122 from the authorization zone 138, and lacking the receipt of any indication that a door handle has been operated, the base station 104 transmits a door lock signal to lock the front right door 142 and the rear right hand door 144 or otherwise facilitates the re-locking of those doors. In one embodiment, the vehicle 102 does not provide a visual indication when the doors 142, 144 are unlocked or subsequently locked.

Figure 5:
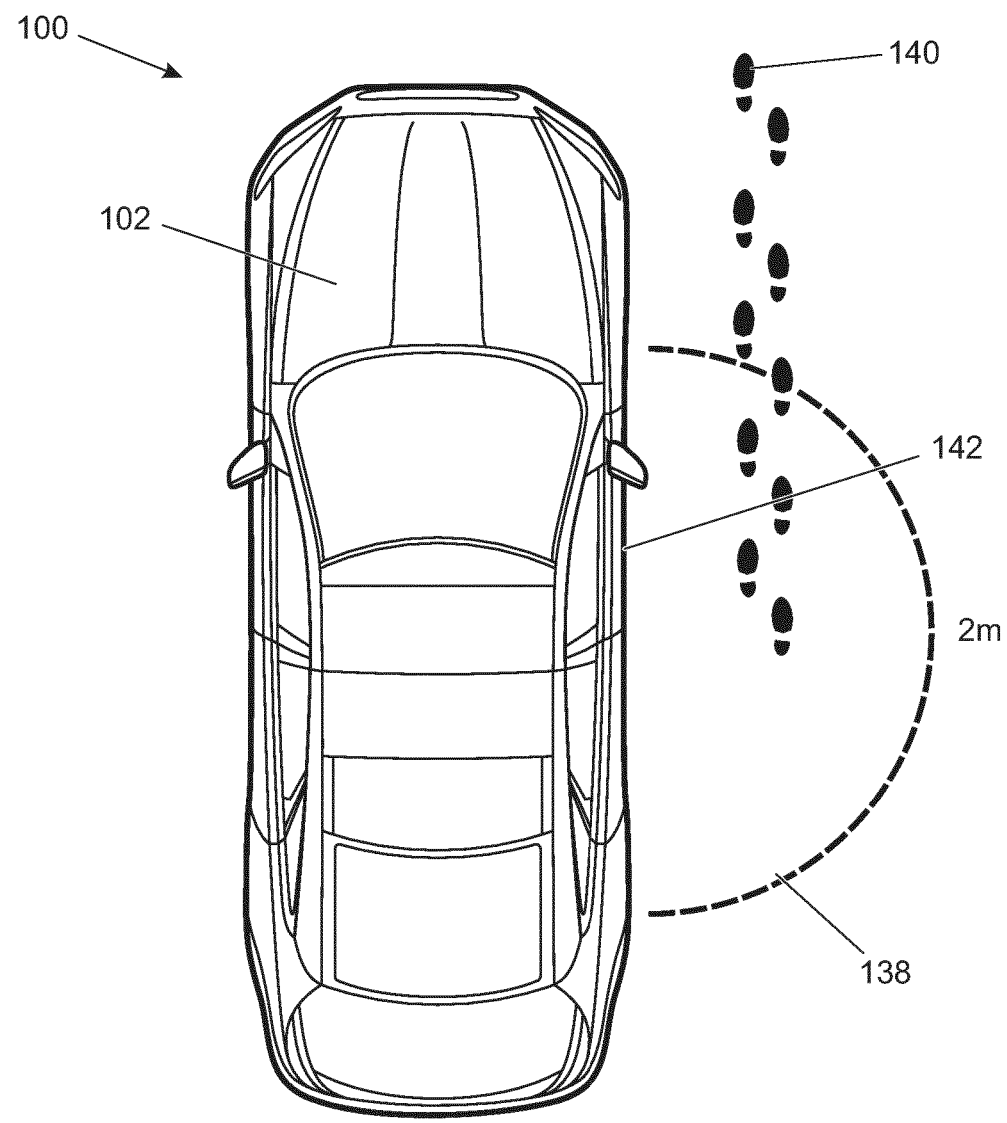
FIG. 5 illustrates another operating mode of the vehicle communication system according to one embodiment of the present invention.

The electronic control unit 106 may be configured to operate the vehicle communication system 100 according to a third operating mode as illustrated in FIG. 5 to facilitate the automatic locking of the doors 142-148 when the user walks away from the vehicle 102. In this scenario, the user exits the vehicle 102 carrying the mobile communication unit 122 and closes the vehicle doors 142-148. In the illustrated example, the user exits the vehicle 102 through the front right door 142 and then closes it. The user then walks away from the vehicle 102 carrying the mobile communication unit 122.

As the mobile communication unit 122 is carried away from the vehicle 102, the vehicle communication system 100 tracks the position of the mobile communication unit 122 and compares that position to the definition of the authorization zone 138. If and when the vehicle communication system 100 determines that the mobile communication unit 122 has left the authorization zone 138, the vehicle communication system 100 transmits a door lock signal to lock the doors 142-148. The vehicle 102 is thereby secured automatically without the user activating the mobile communication unit 122 or taking any action other than walking away from the vehicle 102. A security protocol to comply with industry standards, for example those specified by Thatcham®, would typically be undertaken for the automatic locking of the doors 142-148. Under normal operating conditions, the automatic locking of the vehicle 102 does not double-lock the vehicle 102. Rather, the vehicle 102 would only be double-locked if the user specifically selected this locking mode, for example via a control panel in the vehicle 102.

Figure 6:
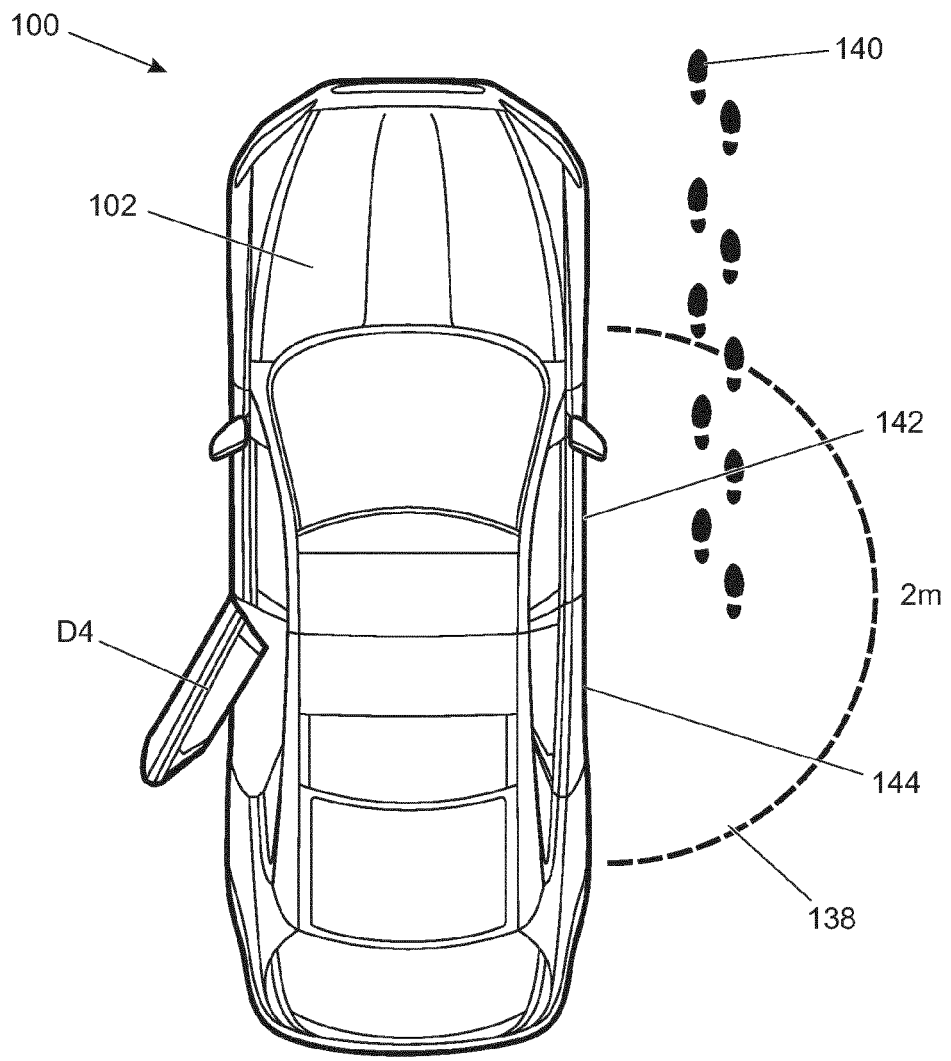
FIG. 6 illustrates another operating mode of the vehicle communication system according to one embodiment of the present invention.

The electronic control unit 106 may be further configured to operate the vehicle communication system 100 according to a fourth operating mode as illustrated in FIG. 6 to accommodate a mis-lock scenario. This mode is similar to the third operating mode described above insofar as the user exits the vehicle 102 through the front right door 142 and closes the door 142 before walking away from the vehicle 102. In connection with this fourth operating mode, the vehicle communication system 100 again determines if and when the mobile communication unit 122 has departed the authorization zone 138. As illustrated in FIG. 6, however, the rear left door 148 is ajar, and the electronic control unit 106 determines that the door 148 cannot be locked (a so-called mis-lock).

To avoid the user leaving the vehicle 102 in an unsecure state (as may otherwise occur if the operator had not noticed that the rear left door 148 was ajar) the electronic control unit 106 transmits an alert signal to the CAN bus 120 and a notification is provided to the user. For example, the CAN bus 120 may illuminate the side repeaters and/or provide an audible warning to notify the user that the doors 142-148 have not all been locked. When the rear left door 148 is closed, the vehicle communication system 100 will lock the door 148 to secure the vehicle 102.

In conjunction with the above-described modes of operation, the electronic control unit 106 may be configured to operate the vehicle communication system 100 according to a fifth operating mode, facilitating active communication among components of the vehicle communication system 100 while also decreasing the likelihood of facilitating performance of a vehicle function in accordance with an inadvertent or unintentional command. In order to identify and avoid unintended and unnecessary actuation of vehicle systems, it may be advantageous for the electronic control unit 106 to be able to evaluate whether a command received from the mobile communication unit 122 is to be considered reliable, and therefore acted upon.

In many cases, the reliability of a command may be evaluated based on position or movement information associated with the mobile communication unit 122. In other cases, it is acknowledged that reliability may not be ascertained, and an assessment may nonetheless be made regarding the gravity of harm that may ensue if an inadvertent command were to be carried out. Where an error might be easily detected and remedial action easily accomplished with little chance for negative consequences, the requested action might be performed with a lesser degree of scrutiny. Where the gravity of harm is more severe or the likelihood of detection less sure or the production of an acceptable remedy more difficult or costly, a greater degree of scrutiny might be required before performing the requested action.

Thus, in one such embodiment, a vehicle communication system 100 for facilitating control over a function of a vehicle 102 comprises a base station 104 that is configured to determine a position of the mobile communication unit 122 relative to the vehicle 102 whenever a user initiated interaction with the vehicle 102 occurs. The position may be stored in the memory for subsequent retrieval and processing. The base station 104 is configured to evaluate whether the position information satisfies predetermined criteria associated with the type of command that is received. For example, when a user initiates interaction with the vehicle 102 including a request to perform a function such as opening a window of the vehicle 102, the base station 104 is configured to receive the request from the mobile communication unit 122, to determine a position of the mobile communication unit 122 relative to the vehicle 102 and to evaluate whether the position information satisfies predetermined criteria for requests to open a window or another aperture of the vehicle 102 (e.g., to compare the position of the mobile communication unit 122 relative to the vehicle 102 to the corresponding criteria).

In one embodiment, the predetermined criteria associated with a request to open a window or other aperture requires that such commands be performed only when the mobile communication unit 122 is within a range of 25 meters from the vehicle 102. Alternatively, the criterion may call for the function to be performed only when the mobile communication unit 122 is within five or ten meters. If the position of the mobile communication unit 122 relative to the vehicle 102 satisfies the appropriate criteria, then the base station 104 facilitates performance of the requested vehicle function. In one embodiment, the base station 104 is configured to facilitate performance of the first vehicle function only if the position of the mobile communication unit 122 satisfies the first criteria.

A criterion associated with a request for performance of a particular function may include that the position of the mobile communication unit 122 be less than a predetermined distance from the vehicle 102. Alternatively, a criterion associated with a request for performance of a particular function may include that the position of the mobile communication unit 122 be greater than a predetermined distance from the vehicle 102.

In one embodiment, the base station 104 is configured to receive a plurality of requests (e.g., two requests, three requests, four requests, or even ten or more requests) from the mobile communication unit 122, each request seeking performance of a unique vehicle function. For example, requests may relate to locking or unlocking an aperture of the vehicle 102, starting or stopping an engine of the vehicle 102, opening or closing an aperture of the vehicle 102, controlling various aspects of an environmental control system (e.g., a heater, blower, defroster, air conditioner), controlling various aspects of an infotainment system (e.g., volume, input source, track, channel, etc.), controlling a vehicle lighting system (e.g., headlamps, fog lamps, interior lighting, puddle lamps), or retrieving information from the vehicle 102 (e.g., a status check).

User controls on the mobile communication unit 122 may be embodied as pushbuttons, touch-screens, switches, dials, knobs, levers, or other interfaces known in the art. Each particular request may be associated with a unique criterion that must be satisfied before the request is performed. Alternatively, requests may be classified into a plurality of categories, each having one or more prerequisite criteria that must be satisfied. As such, one set of positions for the mobile communication unit 122 may be acceptable for a first set of requests, while a second, different set of positions for the mobile communication unit 122 may be required for a second set of requests, and a yet another, third set of positions for the mobile communication unit 122 may be required for a third set of requests.

Thus, the base station 104 may be configured to facilitate performance of a first vehicle function only if the position of the mobile communication unit 122 satisfies a first criteria, while also being configured to facilitate performance of a second vehicle function only if the position of the mobile communication unit 122 satisfies a second criteria, and while further being configured to facilitate performance of a third vehicle function only if the position of the mobile communication unit 122 satisfies a third criteria. To accommodate differing risks and consequences and remedies associated inadvertent commands or differing classes, the position criteria may differ from one requested function to the next.

Similarly to the systems described immediately above, a method for facilitating control over a function of a vehicle 102 may include the steps of providing a base station 104 positioned in the vehicle 102 and a mobile communication unit 122, wherein the base station 104 comprises a first transmitter for transmitting signals and a first receiver for receiving a signal from the mobile communication unit 122 in response to said transmitted signal. The method includes receiving a first request from the mobile communication unit 122 seeking performance of a vehicle function. Upon receiving the request, the base station 104 determines a position of the mobile communication unit 122 relative to the vehicle 102 and compares the position against a predetermined criteria associated with the requested function. If the position of the mobile communication unit 122 relative to the vehicle 102 satisfies the relevant criterion, the base station 104 facilitates fulfillment of the request and performance of the requested function. As described above, multiple requests may be accommodated, each requiring satisfaction of a unique criterion or set of criteria.

As described above, the base station 104 may be configured to determine positions of the mobile communication unit 122 relative to the vehicle 102 based on a time of flight methodology. It should be appreciated, however, that other means for determining a position of the mobile communication unit 122 may be equally applicable.

The vehicle communication system 100 can optionally also provide keyless engine starting for the vehicle 102. By using the ranging data from the transceivers 110, 112, 114, the electronic control unit 106 can determine when the mobile communication unit 122 is inside the vehicle 102. A control signal can be transmitted to the engine control unit, via the CAN bus 120, to permit keyless engine starting when a Start button is pressed.

The vehicle communication system 100 according to the present invention can be further refined. In particular, the electronic control unit 106 can be configured to transmit a status signal to the mobile communication unit 122. For example, if the base station 104 detects a mis-lock scenario, the status signal may instruct the mobile communication unit 122 to generate a first user alert. Equally, the status signal may instruct the mobile communication unit 122 to generate a second user alert (which is different from the first user alert) when the vehicle 102 has been locked. The first and/or the second user alert could be provided instead of, or in addition to, any notification provided by the vehicle 102. The mobile communication unit 122 could comprise an audio, optical or haptic output for indicating the vehicle status. For example, the mobile communication unit 122 could comprise one or more of the following: LED(s), a text screen or a vibrating mechanism.

The mobile communication unit 122 is also provided with one or more buttons to allow a user to trigger locking/unlocking of the vehicle doors from outside of the authorization zone 138.

The ultra-wideband (UWB) transceivers 110, 112, 114, 124 described herein are compliant with IEEE802.15.4a protocol.

The vehicle communication system 100 can monitor time of flight (ToF) communications between the base station 104 and the mobile communication unit 122 to provide improved security, for example to protect against a relay-station security attack.

A door unlock override switch can be provided to unlock the doors 142-148 in the event of an emergency.

The skilled person will understand that various changes and modifications can be made to the vehicle communication system 100 described herein without departing from the spirit and scope of the present invention. For example, a welcome lights function could be supported by illuminating an interior and/or exterior vehicle light when the mobile communication unit 122 enters the authorization zone 138.

Although the vehicle communication system 100 has been described with reference to the mobile communication unit 122 transmitting the polling signal, the system could also operate if the base station 104 transmitted the polling signal. For example, the first transceiver 110 of the base station 104 may transmit a polling signal which, when received by the remote transceiver 124, initiates communication between the mobile communication unit 122 and the base station 104. In one embodiment, upon receipt of the polling signal, the mobile communication unit responds by transmitting a response signal. The response signal is received by the first transceiver 110 and the electronic control unit 106 validates the response signal.

The mobile communication unit 122 includes a motion sensor, such as a gyroscope or an accelerometer, to detect movements of the mobile communication unit 122. Signals based on the detected movements may then be transmitted to the base station 104 for use in deciding whether, when and how to facilitate control over functions of the vehicle 102. For example, if the base station 104 determines that the mobile communication unit 122 has been stationary for a predetermined period of time, the base station 104 may cause the mobile communication unit 122 to be disabled or to enter a sleep mode. In addition, the base station 104 could transmit a disable signal to deactivate the transceivers 110, 112, 114, 124. Alternatively, the transceivers 110, 112, 114, 124 could be disabled automatically if they do not receive an authorization signal for a predetermined period of time. The mobile communication unit 122 could be awakened by an activation signal from the motion sensor when it detects movement.

Moreover, it will be appreciated that it is not necessary for a vehicle communication system 100 according to the present invention to provide all of the operating modes described herein. Rather, one or more of the operating modes could be embodied in a vehicle communication system 100 in accordance with the present invention.

It will be appreciated that various changes and modifications can be made to the present invention without departing from the present invention. Further aspects of the present invention will be described with reference to the following numbered paragraphs.

1. A vehicle communication system (100) for facilitating control over a function of a vehicle (102), the vehicle communication system (100) comprising: a base station (104) positioned in the vehicle (102); and a mobile communication unit (122); the base station (104) comprising a first transmitter for transmitting a signal to the mobile communication unit and a first receiver for receiving a signal from the mobile communication unit (122); the base station (104) configured to: receive a first request from the mobile communication unit (122), wherein the first request seeks performance of a first vehicle function; determine a position of the mobile communication unit (122) relative to the vehicle (102); compare the position of the mobile communication unit (122) relative to the vehicle (102) to a first criteria; and facilitate performance of the first vehicle function if the position of the mobile communication unit (122) relative to the vehicle (102) satisfies the first criteria.

2. A vehicle communication system (100) as described in paragraph 1, wherein the base station (104) is configured to determine the position of the mobile communication unit (122) relative to the vehicle (102) based on a time of flight method.

3. A vehicle communication system (100) as described in paragraph 1, wherein the base station (104) is configured to facilitate performance of the first vehicle function only if the position of the mobile communication unit (122) satisfies the first criteria.

4. A vehicle communication system (100) as described in paragraph 1, wherein the first criteria requires that the position be less than a first distance from the vehicle (102).

5. A vehicle communication system (100) as described in paragraph 1, wherein the first criteria requires that the position be greater than a first distance from the vehicle (102).

6. A vehicle communication system (100) as described in paragraph 1, wherein the base station (104) is configured to: receive a second request from the mobile communication unit (122), wherein the second request seeks performance of a second vehicle function; compare the position of the mobile communication unit (122) relative to the vehicle (102) to a second criteria; and facilitate performance of the second vehicle function if the position of the mobile communication unit (122) relative to the vehicle (102) satisfies the second criteria 7. A vehicle communication system (100) as described in paragraph 6, wherein the base station (104) is configured to facilitate performance of the first vehicle function only if the position of the mobile communication unit (122) satisfies the first criteria, and wherein and the base station (104) is configured to facilitate performance of the second vehicle function only if the position of the mobile communication unit (122) satisfies the second criteria.

8. A vehicle communication system (100) as described in paragraph 6, wherein the first criteria requires that the position be within a first distance from the vehicle (102), and wherein the second criteria requires that the position be within a second distance from the vehicle (102).

9. A vehicle communication system (100) as described in paragraph 8, wherein the first distance is greater than the second distance.

10. A vehicle communication system (100) as described in paragraph 6, wherein the base station (104) is configured to: receive a third request from the mobile communication unit (122), wherein the third request seeks performance of a third vehicle function; compare the position of the mobile communication unit (122) relative to the vehicle (102) to a third criteria; and facilitate performance of the third vehicle function if the position of the mobile communication unit (122) relative to the vehicle (102) satisfies the third criteria.

11. A vehicle communication system (100) as described in paragraph 10, wherein the base station (104) is configured to facilitate performance of the first vehicle function only if the position of the mobile communication unit (122) satisfies the first criteria, and wherein and the base station (104) is configured to facilitate performance of the second vehicle function only if the position of the mobile communication unit (122) satisfies the second criteria, and wherein and the base station (104) is configured to facilitate performance of the third vehicle function only if the position of the mobile communication unit (122) satisfies the third criteria.

12. A vehicle communication system (100) as described in paragraph 10, wherein the first criteria requires that the position be within a first distance from the vehicle (102), wherein the second criteria requires that the position be within a second distance from the vehicle (102), and wherein the third criteria requires that the position be within a third distance from the vehicle (102).

13. A vehicle communication system (100) as described in paragraph 12, wherein the first distance is greater than the second distance, and wherein the second distance is greater than the third distance.

14. A vehicle communication system (100) as described in paragraph 1, wherein the first vehicle function comprises locking an aperture of the vehicle (102).

15. A vehicle communication system (100) as described in paragraph 6, wherein the second vehicle function comprises starting an engine of the vehicle (102).

16. A vehicle communication system (100) as described in paragraph 10, wherein the third vehicle function comprises opening an aperture of the vehicle (102).

17. A vehicle communication system (100) as described in paragraph 10, wherein the third vehicle function comprises closing an aperture of the vehicle (102).

18. A method for facilitating control over a function of a vehicle (102) comprising: providing a base station (104) positioned in the vehicle (102) and a mobile communication unit (122), the base station (104) comprising a first transmitter for transmitting a signal and a first receiver for receiving a signal from the mobile communication unit (122); receiving a first request from the mobile communication unit (122), wherein the first request seeks performance of a first vehicle function; determining a position of the mobile communication unit (122) relative to the vehicle (102); comparing the position of the mobile communication unit (122) relative to the vehicle (102) to a predetermined first criteria; and facilitating performance of the first request if the position of the mobile communication unit (122) relative to the vehicle (102) satisfies a first criteria.

19. A method for facilitating control over a function of a vehicle (102) as described in paragraph 18, further comprising: receiving a second request from the mobile communication unit (122), wherein the second request seeks performance of a second vehicle function; comparing the position of the mobile communication unit (122) relative to the vehicle (102) to a second criteria; and facilitating performance of the second vehicle function if the position of the mobile communication unit (122) relative to the vehicle (102) satisfies the second criteria.

20. A method for facilitating control over a function of a vehicle (102) as described in paragraph 19, further comprising: receiving a third request from the mobile communication unit (122), wherein the third request seeks performance of a third vehicle function; comparing the position of the mobile communication unit (122) relative to the vehicle (102) to a third criteria; and facilitating performance of the third vehicle function if the position of the mobile communication unit (122) relative to the vehicle (102) satisfies the third criteria.

21. A vehicle having a vehicle communication system, or being adapted to perform a method as described in paragraph 1 or 18.

The invention claimed is:

1. A vehicle communication system for facilitating control over a function of a vehicle, the vehicle communication system comprising:
   a base station positioned in the vehicle; and
   a mobile communication unit;
   the base station comprising a first transmitter for transmitting a signal to the mobile communication unit and a first receiver for receiving a signal from the mobile communication unit;
   the base station configured to:
      receive a first request from the mobile communication unit, wherein the first request seeks performance of a first vehicle function;
      receive a second request from the mobile communication unit, wherein the second request seeks performance of a second vehicle function;
      determine a position of the mobile communication unit relative to the vehicle;
      compare the position of the mobile communication unit relative to the vehicle to a first criteria;
      compare the position of the mobile communication unit relative to the vehicle to a second criteria;
      facilitate performance of the first vehicle function if the position of the mobile communication unit relative to the vehicle satisfies the first criteria; and
      facilitate performance of the second vehicle function if the position of the mobile communication unit relative to the vehicle satisfies the second criteria;
      wherein the first criteria requires that the position be within a first distance from the vehicle, wherein the second criteria requires that the position be within a second distance from the vehicle, and wherein the first distance is greater than the second distance.

2. The vehicle communication system of claim 1, wherein the base station is configured to determine the position of the mobile communication unit relative to the vehicle based on a time of flight method.

3. The vehicle communication system of claim 1, wherein the first transmitter is an ultra-wideband transmitter and the first receiver is an ultra-wideband receiver.

4. The vehicle communication system of claim 1, wherein the base station is configured to facilitate performance of the first vehicle function only if the position of the mobile communication unit satisfies the first criteria.

5. The vehicle communication system of claim 1, wherein the first criteria requires that the position be less than or greater than a first distance from the vehicle.

6. The vehicle communication system of claim 1, wherein the base station is configured to facilitate performance of the first vehicle function only if the position of the mobile communication unit satisfies the first criteria, and wherein and the base station is configured to facilitate performance of the second vehicle function only if the position of the mobile communication unit satisfies the second criteria.

7. The vehicle communication system of claim 1, wherein the base station is configured to:
   receive a third request from the mobile communication unit, wherein the third request seeks performance of a third vehicle function;
   compare the position of the mobile communication unit relative to the vehicle to a third criteria; and
   facilitate performance of the third vehicle function if the position of the mobile communication unit relative to the vehicle satisfies the third criteria.

8. The vehicle communication system of claim 7, wherein the base station is configured to facilitate performance of the first vehicle function only if the position of the mobile communication unit satisfies the first criteria, and wherein and the base station is configured to facilitate performance of the second vehicle function only if the position of the mobile communication unit satisfies the second criteria, and wherein and the base station is configured to facilitate performance of the third vehicle function only if the position of the mobile communication unit satisfies the third criteria.

9. The vehicle communication system of claim 7, wherein the first criteria requires that the position be within a first distance from the vehicle, wherein the second criteria requires that the position be within a second distance from the vehicle, and wherein the third criteria requires that the position be within a third distance from the vehicle, wherein the first distance is greater than the second distance, and wherein the second distance is greater than the third distance.

10. The vehicle communication system of claim 7, wherein the third vehicle function comprises opening or closing an aperture of the vehicle.

11. The vehicle communication system of claim 1, wherein the first vehicle function comprises locking an aperture of the vehicle.

12. The vehicle communication system of claim 1, wherein the second vehicle function comprises starting an engine of the vehicle.

13. A vehicle comprising the vehicle communication system of claim 1.

14. A method for facilitating control over a function of a vehicle, the method comprising:
   providing a base station positioned in the vehicle and a mobile communication unit, the base station comprising a first transmitter for transmitting a signal and a first receiver for receiving a signal from the mobile communication unit;
   receiving a first request from the mobile communication unit, wherein the first request seeks performance of a first vehicle function;
   receiving a second request from the mobile communication unit, wherein the second request seeks performance of a second vehicle function;
   determining a position of the mobile communication unit relative to the vehicle;
   comparing the position of the mobile communication unit relative to the vehicle to a predetermined first criteria;
   comparing the position of the mobile communication unit relative to the vehicle to a predetermined second criteria;
   facilitating performance of the first request if the position of the mobile communication unit relative to the vehicle satisfies a first criteria; and
   facilitating performance of the second request if the position of the mobile communication unit relative to the vehicle satisfies a second criteria;
   wherein the first criteria requires that the position be within a first distance from the vehicle, wherein the second criteria requires that the position be within a second distance from the vehicle, and wherein the first distance is greater than the second distance.

15. The method of claim 14, wherein determining the position of the mobile communication unit relative to the vehicle is based on a time of flight method, wherein the first transmitter is an ultra-wideband transmitter and the first receiver is an ultra-wideband receiver.

16. The method of claim 14, further comprising:
receiving a third request from the mobile communication unit, wherein the third request seeks performance of a third vehicle function;
comparing the position of the mobile communication unit relative to the vehicle to a third criteria; and
facilitating performance of the third vehicle function if the position of the mobile communication unit relative to the vehicle satisfies the third criteria.

17. A vehicle configured to perform the method of claim 14.

* * * * *